US012602880B2

(12) United States Patent
Stoski et al.

(10) Patent No.: US 12,602,880 B2
(45) Date of Patent: Apr. 14, 2026

(54) CONTROLLING AUGMENTED REALITY CONTENT VIA SELECTION OF REAL-WORLD LOCATIONS OR OBJECTS

(71) Applicant: Niantic Spatial, Inc., San Francisco, CA (US)

(72) Inventors: Christopher Grant Stoski, San Rafael, CA (US); Marcus Romell Reed, San Bruno, CA (US); Jose Juan Ceballos, San Rafael, CA (US); Marcos Enrique Borregales, Discovery Bay, CA (US); Justin Ryan Pando, I, Portland, OR (US)

(73) Assignee: Niantic Spatial, Inc., San Francisco, CA (US)

( * ) Notice: Subject to any disclaimer, the term of this patent is extended or adjusted under 35 U.S.C. 154(b) by 294 days.

(21) Appl. No.: 18/083,344

(22) Filed: Dec. 16, 2022

(65) Prior Publication Data

US 2023/0196693 A1     Jun. 22, 2023

Related U.S. Application Data

(60) Provisional application No. 63/290,645, filed on Dec. 16, 2021.

(51) Int. Cl.
 *G06T 19/00*      (2011.01)
 *G06T 15/06*      (2011.01)
(52) U.S. Cl.
 CPC ............ *G06T 19/006* (2013.01); *G06T 15/06* (2013.01); *G06T 19/003* (2013.01)

(58) Field of Classification Search
 CPC ...... G06T 19/006; G06T 15/06; G06T 19/003
 See application file for complete search history.

(56) References Cited

U.S. PATENT DOCUMENTS

| | | | |
|---|---|---|---|
| 2016/0284136 A1 | 9/2016 | Johnston et al. | |
| 2017/0132839 A1 | 5/2017 | Ambrus et al. | |
| 2017/0330362 A1 | 11/2017 | Sumner et al. | |
| 2019/0122433 A1* | 4/2019 | Thorisson | G06F 3/011 |

(Continued)

FOREIGN PATENT DOCUMENTS

| | | |
|---|---|---|
| KR | 10-2021-0101518 A | 8/2021 |
| WO | WO 2021-221394 A1 | 11/2021 |

OTHER PUBLICATIONS

PCT International Search Report and Written Opinion, PCT Application No. PCT/IB2022/062415, Mar. 21, 2023, 10 pages.

(Continued)

*Primary Examiner* — Grace Q Li

(74) *Attorney, Agent, or Firm* — Fenwick & West LLP

(57) ABSTRACT

A client device and a controller allow a user to control AR content by selecting real-world locations or objects. The client receives position data indicating a position and orientation of the controller, the position data defining an axis of the controller. The client device performs ray casting to determine a location in a 3D map of a real world that intersects the axis. The client device receives a selection indication (e.g., a user pressing a button on the controller). The client device selects, subsequent to the selection indication, the location in the 3D map that intersects the axis as a waypoint. The client device defines a route for a virtual object based on the waypoint.

20 Claims, 8 Drawing Sheets

(56)             References Cited

U.S. PATENT DOCUMENTS

| | | | |
|---|---|---|---|
| 2019/0238658 A1* | 8/2019 | Shimizu | H04W 4/46 |
| 2019/0295315 A1* | 9/2019 | Levinson | G06T 17/20 |
| 2019/0392643 A1 | 12/2019 | Busto et al. | |
| 2020/0143595 A1 | 5/2020 | Hrincár et al. | |
| 2020/0394819 A1* | 12/2020 | Reddan | G01B 11/026 |
| 2021/0082084 A1 | 3/2021 | Baldus | |
| 2022/0382367 A1* | 12/2022 | Reddy | G06F 3/012 |
| 2023/0013014 A1* | 1/2023 | Zhou | A63F 13/52 |

OTHER PUBLICATIONS

European Patent Office, Extended European Search Report and Opinion, European Patent Application No. 22906836.6, Oct. 22, 2025, nine pages.

* cited by examiner

Route 405

Controller Axis 410

Controller 400

Hand and controller at $t_1$

Hand and controller at $t_2$

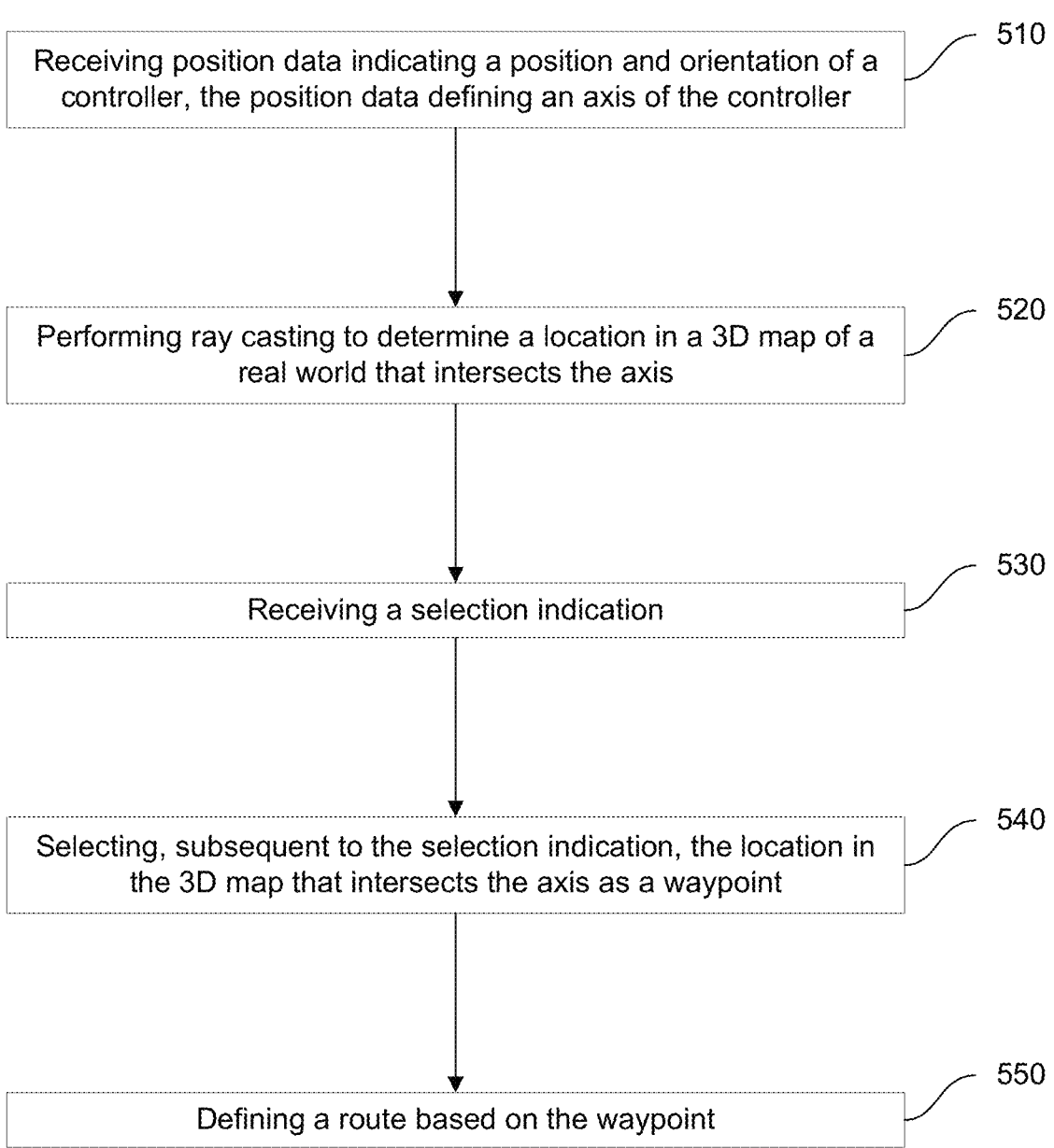

500

Receiving position data indicating a position and orientation of a controller, the position data defining an axis of the controller — 510

Performing ray casting to determine a location in a 3D map of a real world that intersects the axis — 520

Receiving a selection indication — 530

Selecting, subsequent to the selection indication, the location in the 3D map that intersects the axis as a waypoint — 540

Defining a route based on the waypoint — 550

CONTROLLING AUGMENTED REALITY CONTENT VIA SELECTION OF REAL-WORLD LOCATIONS OR OBJECTS

CROSS-REFERENCE TO RELATED APPLICATIONS

This application claims priority to U.S. Provisional Application Ser. No. 63/290,645 "Controlling Augmented Reality Content By Selecting Real-World Positions Or Objects" filed on Dec. 16, 2021, which is incorporated herein by reference in its entirety.

BACKGROUND

1. Technical Field

The subject matter described relates generally to augmented reality (AR) content and, in particular, to a method of controlling AR content by selecting real-world locations or objects.

2. Problem

Display devices can be used to present information to a user through an immersive experience. A wide range of applications use AR techniques to present virtual objects in a depiction of a real-world scene. However, interactions between virtual objects and real-world objects are typically limited to non-existent. Furthermore, virtual objects tend to be static once placed in the world.

SUMMARY

In light of the above, there is thus a need in the art for methods to control the movement and other behavior of virtual objects relative to the real-world environment they are displayed in conjunction with.

A client device can provide (e.g., display) various AR experiences in which virtual content is displayed in conjunction with the real world. In various embodiments, the client device displays virtual content on a display and the user views the real world through the display. For example, the client device is an AR headset (e.g., AR glasses or goggles) wore by the user. Thus, from the user's perspective, the virtual objects are located in the real world. To enable this, the virtual content is positioned using a 3D map (e.g., a mesh or point cloud) of the real-world environment around the user. The 3D map may use a virtual coordinate system with a one-to-one relationship with at least a portion of the real world.

For example, the client device may estimate depth information for pixels of images captured by one or more cameras on or associated with the client device. The client device may display a virtual object in the external environment based on the depth information. Semantic segmentation may also be used to identify portions of the 3D map that correspond to real-world objects, such as fire hydrants, trees, cars, people, benches, walls, etc. The client device may also display the virtual object interacting with the identified objects in the external environment (e.g., walking, climbing, or crawling, on one or more of the identified objects in the external environment). Thus, the virtual object may appear more realistic or lifelike to the user.

The user may control one or more virtual objects, such as a virtual character, by selecting an object or location in the real world. The user holds a controller (e.g., a smartphone or dedicated controller device) that includes one or more location sensors that track the position and/or orientation of the controller. The user points the controller at a location or object in the real world and provides a selection indication (e.g., by pressing a button or pulling a trigger on the controller, issuing a verbal command, performing a gesture, or the like) to select that object or location. To determine the selected object or location, ray casting may be performed to determine where an axis defined by the controller first intersects with a surface in the 3D map. This point of intersection in the 3D map is the location or object selected. The point of intersection may be defined as a waypoint. In some embodiments, a reticle or other indicator is used to indicate to the user the location or object that is currently indicated by the controller. For example, if the user is wearing an AR headset, a reticle may be displayed indicating what location or object in the real world will be selected if the user issues a selection command.

A route for the virtual object is determined based on the selected object or location. For example, selection of an object or location is interpreted as an instruction to move a virtual character (or other object) to the selected location or have the virtual character interact with the selected object. In some embodiments, the user may select multiple points or objects in order and the virtual character may move to or interact with the selected locations/objects in order. In other words, the user may define a route or other series of interactions using waypoints defined by pointing to the corresponding locations in the real-world using the controller.

In some aspects, the techniques described herein relate to a method for defining a route for a virtual object in an augmented reality (AR) application, the method including: receiving position data indicating a position and orientation of a controller, the position data defining an axis of the controller; performing ray casting to determine a location or object in a 3D map of a real world that intersects the axis; receiving a selection indication; selecting, subsequent to the selection indication, the location in the 3D map that intersects the axis as a waypoint; and defining the route based on the waypoint.

Other aspects include components, devices, systems, improvements, methods, processes, applications, computer readable mediums, and other technologies related to any of the above.

BRIEF DESCRIPTION OF THE DRAWINGS

FIG. 3 is a block diagram of a networked computing environment suitable for defining a route for a virtual object in an augmented reality (AR) application, according to one embodiment.

FIG. 5 is a flowchart describing an example method 500 for defining a route for a virtual object in an augmented reality (AR) application, according to one embodiment.

3
DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where controlling virtual objects in the real world is desirable. In addition, the inherent flexibility of computer-based systems allows for a great variety of possible configurations, combinations, and divisions of tasks and functionality between and among the components of the system.

Example Location-Based Parallel Reality Game

Figure 1:
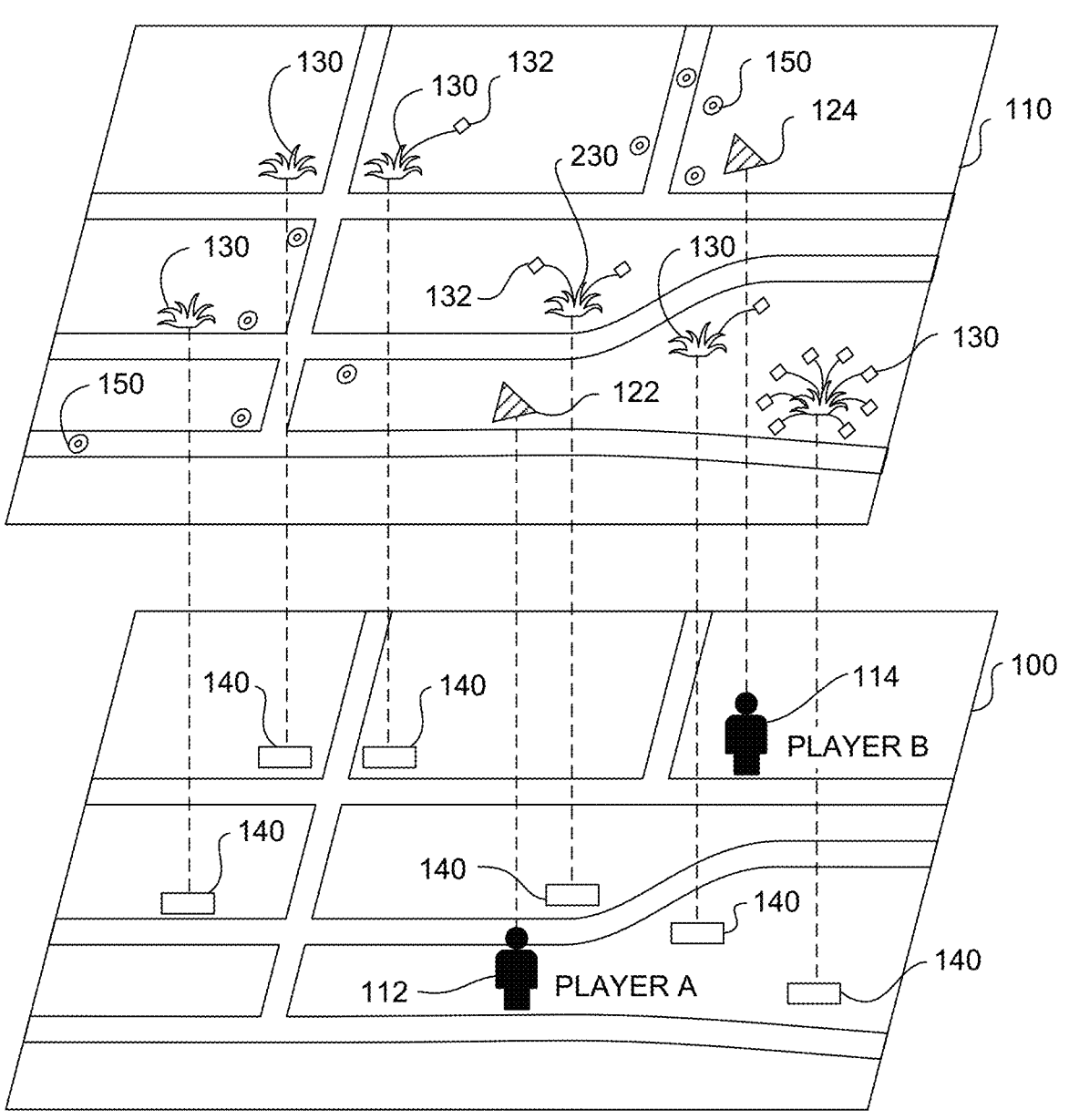
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game (a player may also be referred to as a user). As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual objects (also referred to as virtual elements) scattered at various virtual locations in the virtual world 110. As described herein a virtual object can be an AR or VR object that is displayed. Virtual objects include animate and inanimate objects. Animate objects may be referred to as a virtual character. Virtual characters can represent a character of the game, such as a playable character or a non-player character (NPC). A player can travel to these virtual locations by traveling to the corresponding location of the virtual objects in the real world 100. For instance, a positioning system can track the position of the player such that as the player navigates the real world 100, the player also navigates the parallel virtual world 110. The player can then interact with various virtual objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g. weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
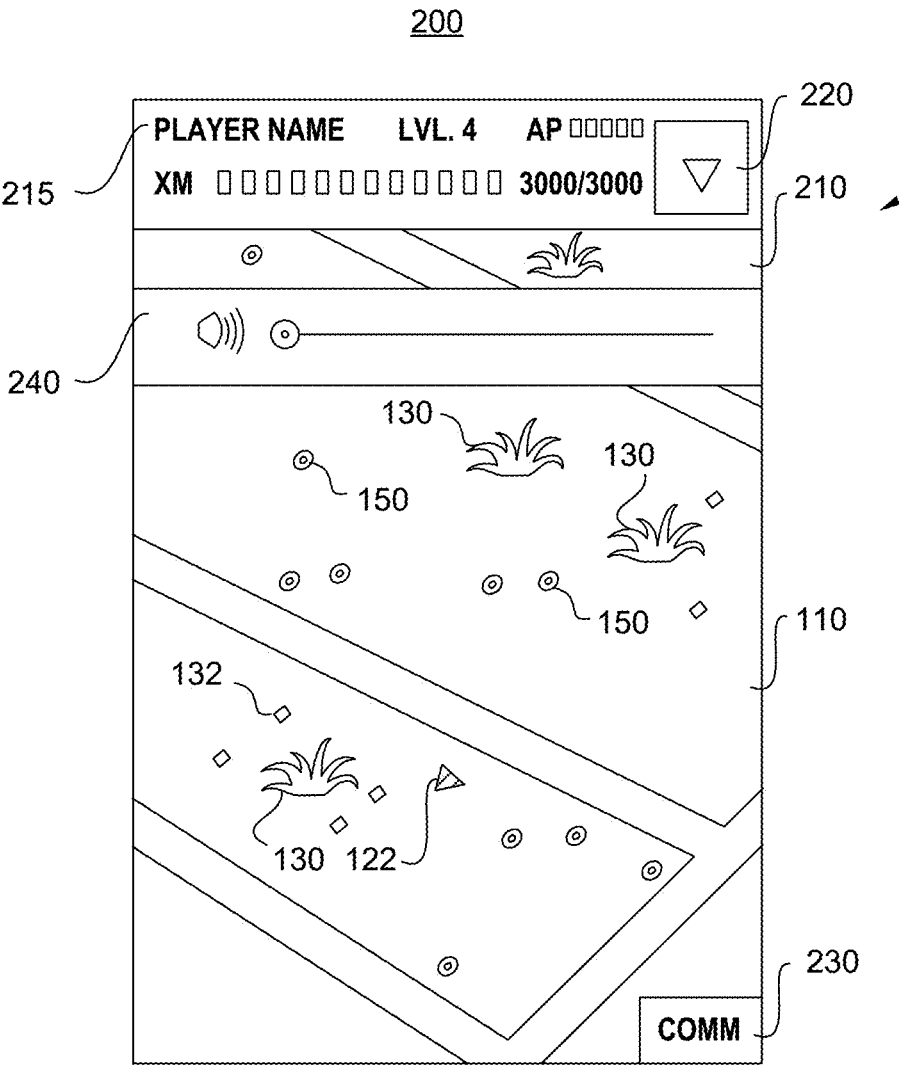
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device 310 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a user to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
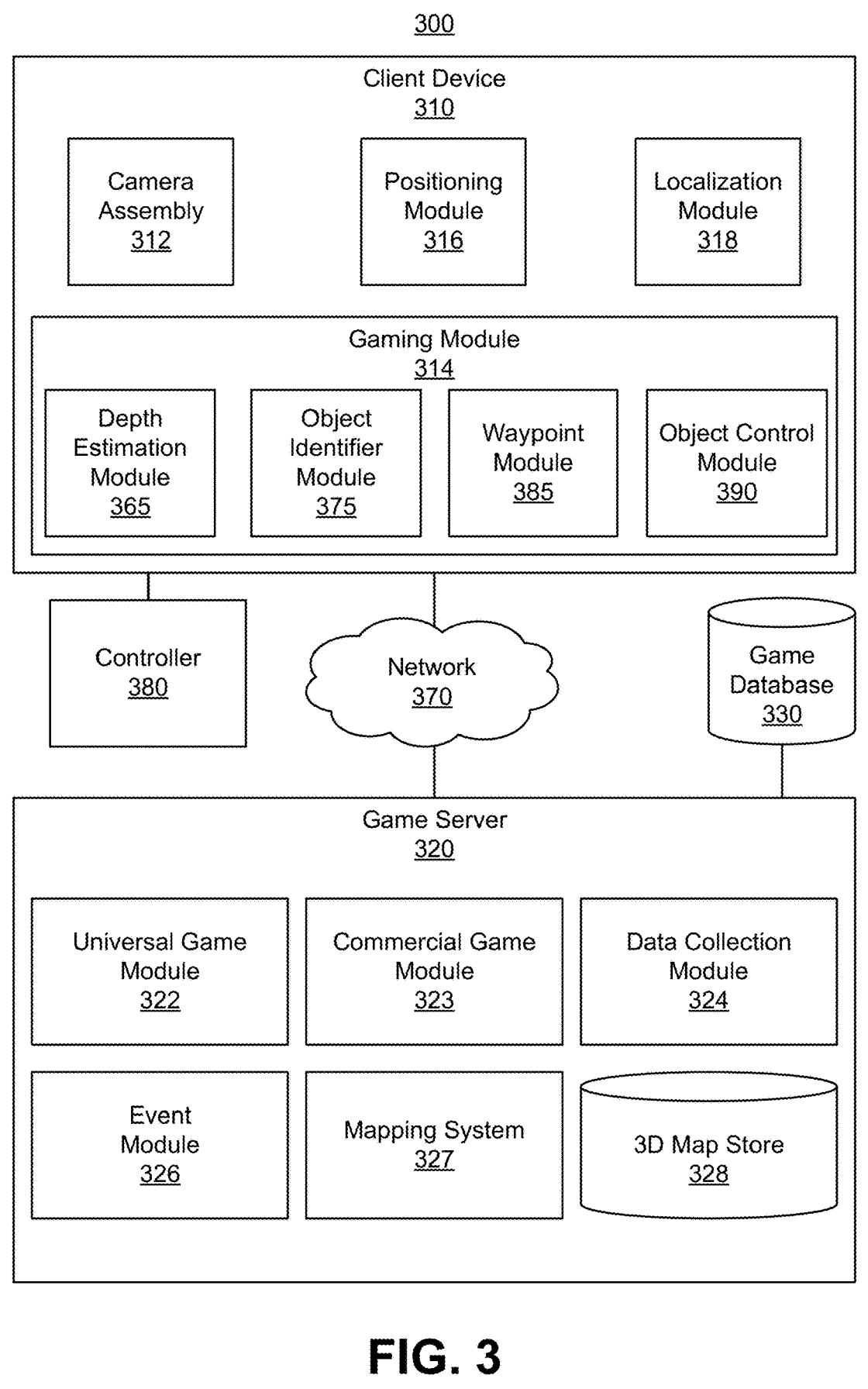

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also may include other external systems such as sponsor/advertiser systems or business systems. Although only one client device 310 is shown in FIG. 3, any number of client devices 310 or other external systems may be connected to the game server 320 over the network 370. In addition, the client device 310 is shown as connected to a controller 380 with which a user may indicate locations or object in the real world (and thus corresponding locations in the virtual world) or objects in the real world. It should be recognized that some or all of the functionality attributed to the client device 310 may be performed by the controller 380. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

The controller 380 can be a smartphone or other computing device or a dedicated controller. The controller 380 includes one or more sensors that generate positional data that indicates the location and/or orientation of the controller. The one or more sensors may enable the controller to be tracked along three or more (e.g., six) degrees of freedom. The controller 380 may also include one or more buttons. In one embodiment, the user may select real-world locations or objects by pointing the controller at them and issuing a selection command (e.g., by pressing a button, issuing a verbal command, performing a gesture, or the like). Based on the position and orientation of the controller 380, ray casting may be performed to identify a position in the virtual world that corresponds to the real world object or location at which the controller is pointed. For example, in an AR application, a 3D mesh is used in the virtual world that represents the corresponding geometry of the real-world environment. Assuming that the mesh is a reasonably accurate representation of the real-world environment, using ray casting to find where an axis of the controller 380 (e.g., the direction it is pointed) intersects with the mesh will identify the portion of the mesh that corresponds to the real-world location or object at which the user pointed the controller 380. The real-world location or object may be indicated by a reticle or other indicator displayed in conjunction with imaged captured by the camera assembly 312.

Instead of, or in addition to, a user using a controller 380 to indicate locations or objects, the gaming module 314 performs (e.g., computer-vision) hand tracking that allows a user to indicate locations or objects. For example, a user performs hand gestures, such as pointing. In some embodiments, a computer-vision module or algorithm is used (e.g., applied to images from the camera assembly 312) to identify a hand gesture. An identified gesture may then be translated to interactivity in a similar way as the controller 380. For example, after a hand gesture is identified (e.g., user is pointing), a position and orientation of the gesture may be determined (the position and orientation may define an axis of the gesture). Based on the position and orientation of the gesture, ray casting may be performed to identify a location or object in a 3D map of the real world that the gesture is pointing to (e.g., where the axis of the gesture intersects the 3D map). In some embodiments, a user pinching their thumb and fore finger together translates to a grabbing mechanism that activates the ray casting, and moving their hand around moves the virtual object accordingly to move them around the virtual world as it corresponds to the real-world. In this disclosure, descriptions or references to a user using a controller may also be applicable to a user using a hand gesture.

A client device 310 can be any portable computing device capable for use by a player to interface with the game server 320. For instance, a client device 310 is preferably a portable wireless device that can be carried by a player, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The gaming module 314 includes a depth estimation module 365, an object identifier module 375, a waypoint module, and an object control module 390. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g. renders imagery of the virtual world) and allows a user to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The gaming module 314 can access game data received from the game server 320 to provide an accurate representation of the game to the player. The gaming module 314 can receive and process player input and provide updates to the game server 320 over the network 370. The gaming module 314 may also generate or adjust game content to be displayed by the client device 310. For example, the gaming module 314 may generate a virtual element based on information describing the real world (e.g., a 3D map). For example, the gaming module 314 may determine a path for a virtual element in the real world based on the 3D map.

In one embodiment, the user may select a path for a virtual element in the real world using the controller 380 to identify waypoints, as described previously. Additionally, or alternatively, the user may cause the virtual element (e.g., character) to interact with a real-world or virtual object by selecting it using the controller. For example, the user may indicate a bench and the virtual character may be depicted walking over to the bench and sitting on it.

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g. to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dad reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 310 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from users (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g. player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal game module 322, a commercial game module 323, a data collection module 324, an event module 326, a mapping system 327, and a 3D map 328. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g. depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from external systems such as sponsors/advertisers, businesses, or other entities over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g. intranet), wide area network (e.g. Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

In some embodiments, the gaming module 314 includes a depth estimation module 365, an object identifier module 375, a waypoint module 385, and an object control module 390. Although these modules are stored on the client device 310 in FIG. 3, one or more of these modules may be may stored on the game server 320. For example, images captured by the camera assembly 325 are sent to a module on the game server 320 and the module later provides display instructions to the client device 310 via the network 370. Additionally, although the modules are part of the gaming module 314, the modules are not limited to gaming contexts. Modules 365, 375, and 390 are further described below.

The depth estimator module 365 estimates a distance for pixels in images captured by the camera assembly 312. The distance for a pixel (e.g., each pixel of a capture image) is the estimated distance from the camera assembly 312 to the real-world object that corresponds to the pixel. Based on the estimated distances (also referred to as depth information), the gaming module 314 may display (e.g., provides instructions for the client device 310 to display) a virtual object in the external environment. For example, if a virtual object will be displayed near an object, the size of the virtual object may be adjusted based on the estimated distance of the object. In some embodiments, the depth information enables a virtual object to be displayed partly behind by an object. For example, if depth information indicates that a real-world object is closer than a location of a virtual object to be displayed, the virtual object may be displayed such that the real-world object appears to obscure a portion of the virtual object. Thus, using depth information may make the virtual objects appear more realistic.

The depth estimator module 365 may be machine learned. For example, it is trained using training images that include object distance labels for groups of pixels in the image (e.g., that have been manually labelled). If the client device includes two cameras, a distance may be estimated based on stereo image data. Alternatively, rules-based approach may be used in which rules are applied to input images to estimate a distance of objects in the input images.

The object identifier module 375 receives and analyzes images captured by the camera assembly 312 to identify real world objects in the images (e.g., it performs semantic segmentation). The object identifier module 375 may identify inanimate objects and animate objects (e.g., animals and humans) or even parts of animate objects (e.g., a hand or a leg). Identifying an object may refer to recognizing that a group of pixels in an image represent an object and determining an object type of the object. An object type describes what the object is (e.g., human, dog, chair, wall, desk, or lamp). For example, the object identifier module 375 determines a group of pixels represent a chair. The object identifier module 375 may be configured to identify common objects in a room, such as walls, tables, chairs, pictures, and lights. In some embodiments, the object identifier module 375 uses or includes a machine learned classifier that can identify one or more types of objects in input images (or time series of images). The classifier may be trained using training images that include object type labels for groups of pixels (e.g., that have been manually labelled). In some embodiments, the object identifier module 375 uses or includes multiple machine learned classifiers, where each classifier is trained to identify one or more different object types. For example, a first classifier is trained to identify trees, a second classifier is trained to identify grass, a third classifier is trained to identify flowers, etc. Additionally, or alternatively, a rules-based approach may be used to identify real world objects in which rules are applied to input images to determine whether a given type of object is depicted.

In some embodiments, the object identifier module 375 identifies one or more materials and/or textures of the identified objects. For example, after a building is identified, the object identifier module 375 determines whether the exterior of the building (or a portion of the exterior) is made of stone, brick, glass, or other material. In another example, the object identifier module 375 determines a material of the ground (e.g., cement, asphalt, grass, snow, or dirt).

The waypoint module 385 establishes waypoints. A waypoint is a location or object in the real world that was selected by a user (e.g., using the controller). More specifically, a waypoint is specified on a 3D map of the real world. As previously discussed, waypoints may be used to define a route for a virtual object. Waypoints may be displayed to the user. The ability for the user to select locations or object in the real world as waypoints enables many different AR (e.g., game) mechanics for controlling virtual objects in the real world.

To establish a waypoint, the following steps may be performed. The waypoint module 385 receives position data from the controller 380. The waypoint module 385 may analyze the position data to determine the position and orientation of the controller 380. Using the determined position and orientation, the waypoint module 385 may determine an axis of the controller 380 (e.g., an axis indicating where the controller is pointing). The waypoint module 385 may perform ray casting to determine locations or objects in a 3D map of the real world that intersect the controller axis. To acquire a 3D map of the surrounding environment, the 3D map may be determined in real time (e.g., by the mapping system 327) based on images captured by the camera assembly 312 or retrieved from the 3D map store 328 (e.g., the 3D map was previously determined). The waypoint module 385 may also receive a selection indication (e.g., selection data is received from the controller 380 indicating the user pressed a button or pulled a trigger). Subsequent to (e.g., responsive to) receiving the selection indication, the waypoint module 385 selects the location or object in the 3D map that intersects the axis of the controller 380 as a waypoint (e.g., the location or object the controller was pointing at when the selection indication occurred (or within a threshold time of the occurrence)).

The object control module 390 determines how virtual objects interact with the environment around them. This may result in the virtual objects appearing more realistic and lifelike to the user. As described previously, in one embodiment, the user may use the controller 380 to issue commands to a virtual character or other virtual object. In various examples, the user may define a travel route for a virtual object by selecting waypoints, issue commands to the virtual character to perform certain actions (e.g., jump, duck, dance, etc.), or control the virtual object's movement directly (e.g., using a joystick or directional pad to indicate a direction in which the virtual object should move). The user may also user the controller 380 to instruct a virtual object to interact with physical objects or other virtual objects. For example, the user may select a basketball hoop (either real or virtual) to cause a virtual character to dunk a basketball through it.

In some embodiments, the object control module 390 receives identified objects from the object identifier module 375. The object control module 390 may display virtual objects directly or indirectly interacting with the identified objects. Examples of indirect interactions with an identified object in the real world include a virtual object (e.g., character) walking around or looking at the object. Examples of direct interactions with an identified object in the real world include a virtual object (e.g., character) touching, leaning on, standing on, or climbing on the object. For example, the object control module 390 displays a virtual character climbing on (e.g., up or down) an object, such as a stick-type object or an object with ledges or handles. In another example, the object control module 390 displays a virtual character sliding down a sloped surface that is angled by more than a threshold amount (e.g., less than eighty degrees and more than five degrees) relative to what the object control module 390 has determined to be the ground plane (e.g., the plane that is perpendicular to the force of gravity or the average orientation of the visible ground in the camera's field of view, etc.). How a virtual object interacts with an identified real world object may depend on characteristics of the identified object (e.g., shapes, surfaces, materials, textures, or some combination thereof of the identified object) and characteristics of the virtual object (e.g., traversal characteristics of the virtual object).

In some embodiments, the object control module 390 displays virtual objects interacting with the user. For example, a user can 'pick up' a virtual object and move it to a different location in the environment. In another example, the object control module 390 provides instructions so that a virtual object 'follows' a user or person in the external environment. In this example, the object control module 390 may identify an object as a human. The object control module 390 may then display a virtual character moving (e.g., walking) behind the human in the environment. Components of the human's body may be identified (e.g., leg, torso, and arms) so that the virtual character can be displayed as walking in lockstep behind the human. In the previous examples related to following, the user may use the controller to 'select' a person in the real world. A route for the virtual object may then be determined based on the location of the selected person in the real world. If the person moves, the route may be modified or a new route may be made depending on the location of the person and the location of the virtual object.

The object control module 390 may define a route for a virtual object based on a waypoint. The object control module 390 may also determine how the virtual object moves along the route. A route defines a pathway in the real world for a virtual object to move along. The route may have a start point and an end point. In some cases, the starting point for the route may be at or within a threshold distance of a current location of the virtual object scheduled to move along the route.

As previously started, the route may be defined based on one or more waypoints. The relationship between a waypoint and a route depends on the AR application. For example, a start or end point of a route may be defined by a waypoint (e.g., if the selected waypoint is the end point, a virtual object may move from its current location in the real world to the location of the waypoint in the real world). In another example, if multiple waypoints are established, a route may be defined to intersect (or avoid) all of the waypoints. In another example, if two waypoints are established, a line connecting the two waypoints may indicate a movement direction and movement speed for a virtual object in the real world (e.g., the distance between the waypoints determines the movement speed of the virtual object).

A route may be determined based on identified objects in the real world. For example, the object control module 390 defines a route around or between objects identified in the real world. In another example, the object control module 390 determines whether a virtual character will step over, jump over, climb over, or crawl under a real world object as the character moves along the route. Additionally, a route may be determined based on shapes, surfaces, materials, textures, or some combination thereof of the identified objects in the real world. For example, a route for a virtual object that moves on land may avoid bodies of water (e.g., ponds and water fountains). In another example, if a virtual character is able to climb up walls made of stone or brick but not glass, the object control module 390 may define a route up a brick building that avoids glass windows. In another example, a virtual object may be able to walk on dirt or asphalt but unable to walk though snow. Thus, the object control module 390 may form a route for that virtual object that avoids snow. In another example, a virtual object may have a slower movement speed moving up an inclined surface and a faster movement speed moving down a declined surface.

As suggested by examples in the previous paragraph, the route may be determined based on traversal characteristics of the virtual object scheduled to traverse the route. Traversal characteristics specify a virtual object's ability to traverse terrain in the real world (e.g., jump height, ability to climb, ability to fly or glide, and walking or running speeds over different types of terrain). For example, if a virtual character can jump high, the route may be defined so that the virtual character jumps over certain real world objects instead of walking around them. In another example, if a virtual character can climb up objects, the route may be defined so that the character climbs over or around real world objects instead of walking around them. In another example, if a virtual object has different movement speeds across different ground materials, the route may be defined to avoid slow ground materials for the virtual object.

In some embodiments, the gaming module 314 includes a virtual camera module (not illustrated) that allows a user to take photographs that show virtual objects in the external environment. In these embodiments, the virtual objects may also be displayed based on depth information.

Figure 4A:
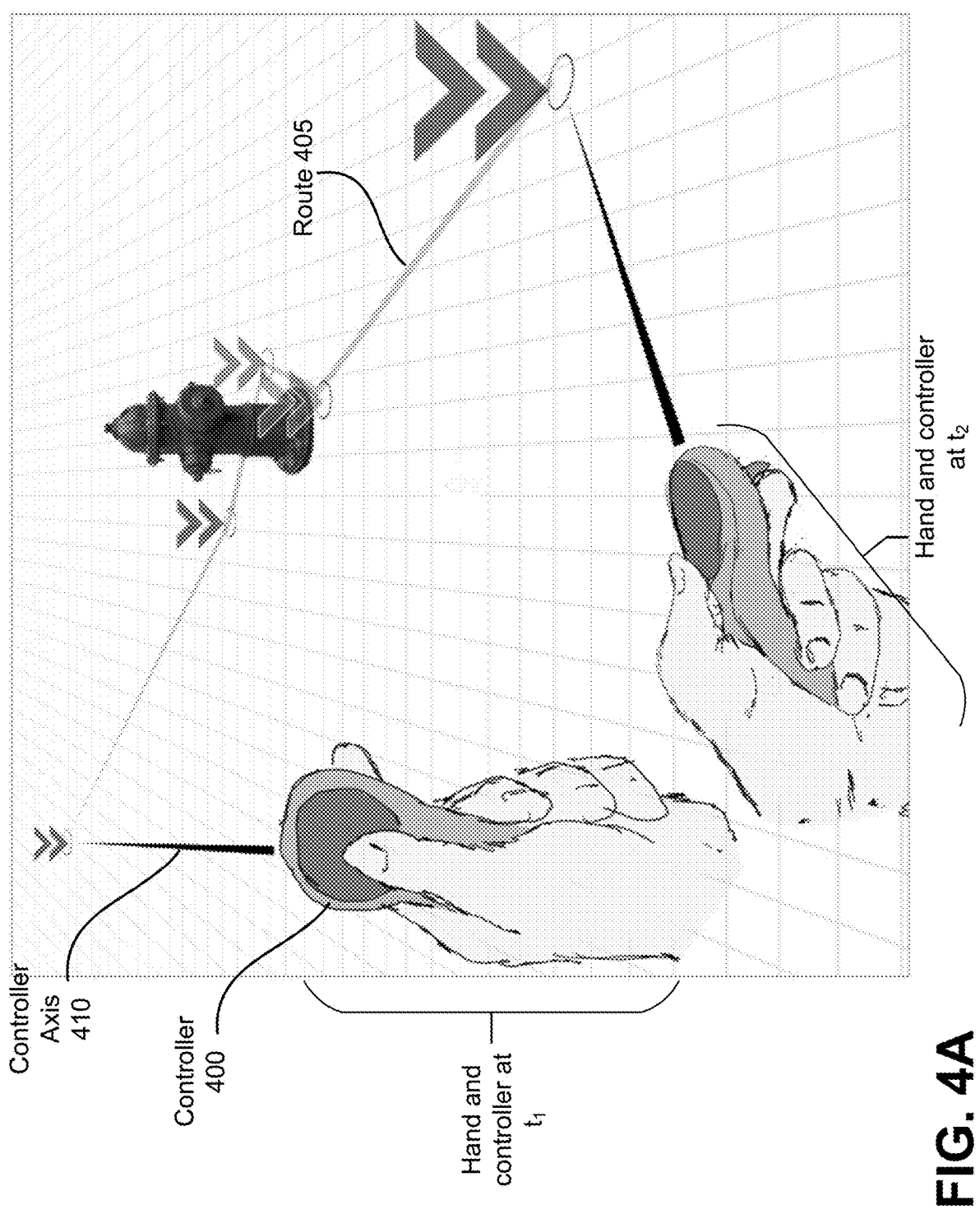
FIGS. 4A-4C illustrate examples of a user using a controller 400 to control a virtual character, according to various embodiments.
Figure 4B:
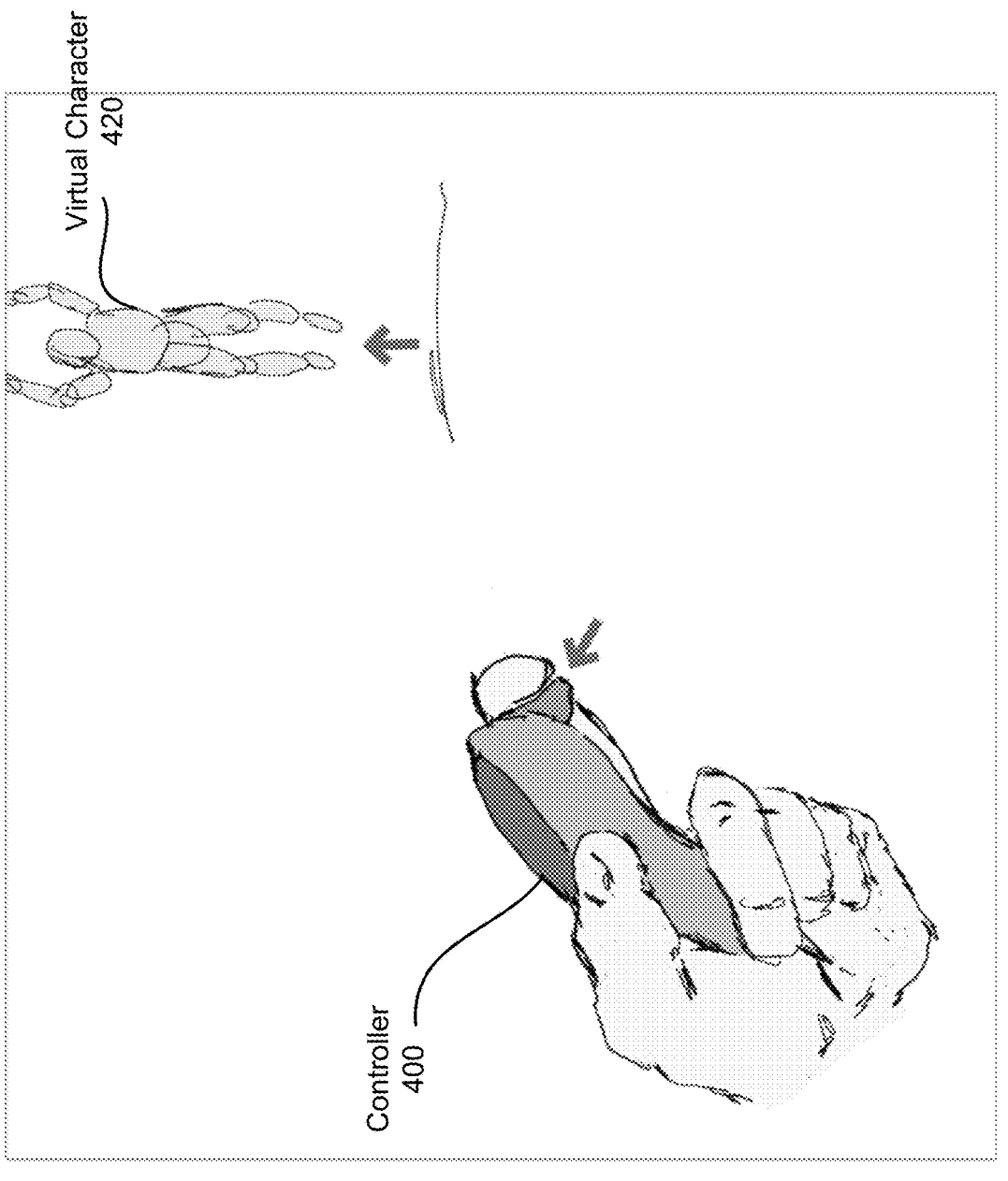
Figure 4C:
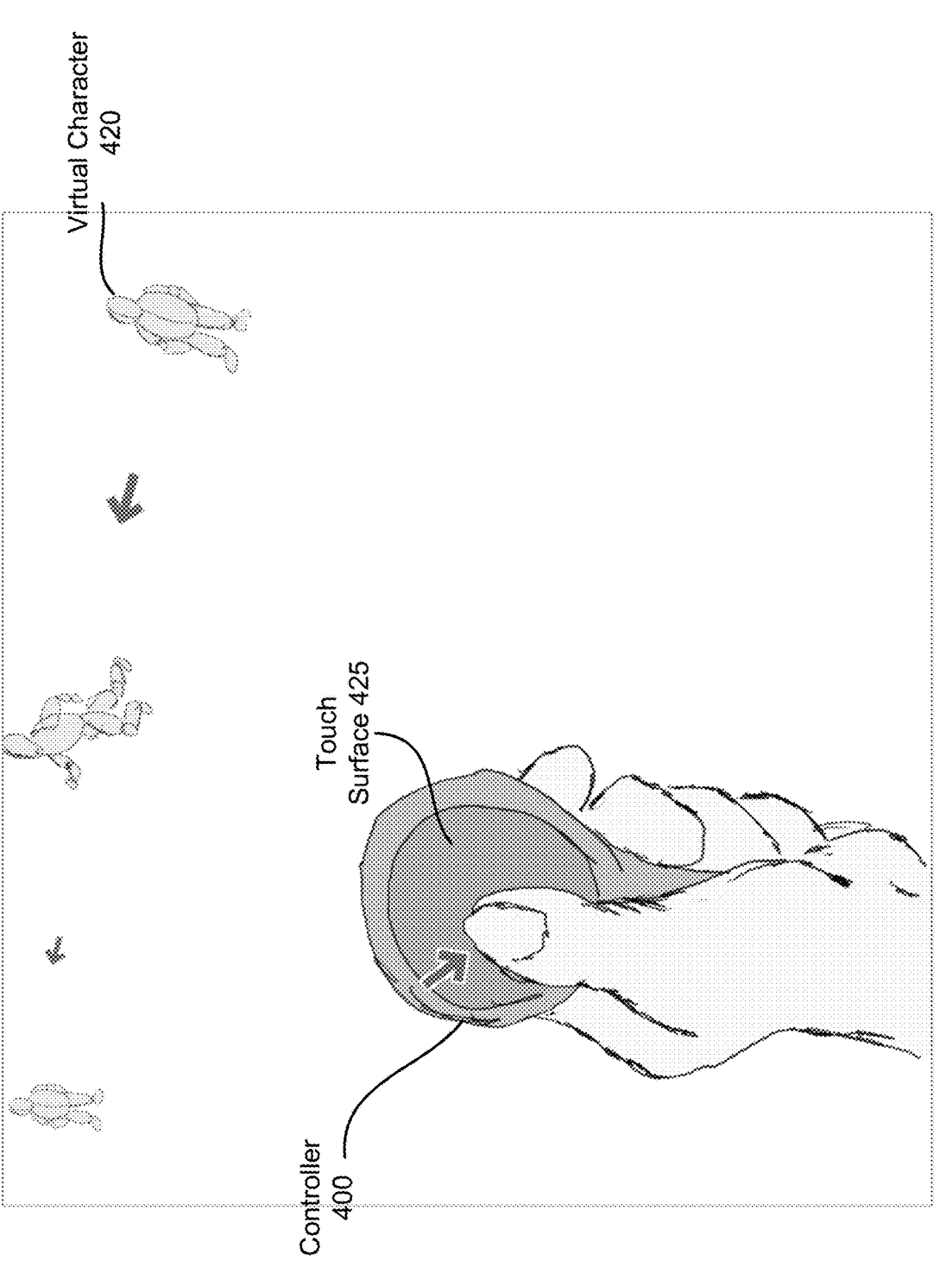

FIGS. 4A-4C illustrate examples of a user using a controller 400 to control a virtual character, according to various embodiments (controller 400 is an example embodiment of controller 380). In FIG. 4A, a user is using the controller 400 to select points in the real world by pointing the controller 380 and clicking a button on the controller 380 to indicate corresponding points in the real world. This allows the user to control the navigation of a virtual object across a real world surface using a 'point-and-click' interface. Specifically, FIG. 4A illustrates the user's hand holding a controller at two different points in time ($t_1$ and $t_2$). In the example of FIG. 4A, the controller axis 410 and reticle are displayed to the user so they can determine where the controller is pointing (this may not be the case in other embodiments though). The selected points in the real world are defined as waypoints (each indicated by a pair of chevrons in FIG. 4A). The pairs of chevrons are displayed to the user so they know the locations of the waypoints. As previously discussed, the location of the waypoints in the real world may be determined by performing ray casting to determine a position in a 3D map of the real world that interests the axis 410 of the controller 400. A route 405 is formed according to the defined waypoints. In the example of FIG. 4A, the route 405 is formed to intersect all of the waypoints. However, in another example, a route may be formed to avoid or circumnavigate waypoints (e.g., at least a threshold distance away). A virtual object (e.g., character) may traverse along the route 405, thus allowing the user to control the movement of the virtual object. Said differently, the user can define a path for a virtual object to follow.

In FIG. 4B, the user is causing a virtual character 420 to jump, double jump, or even triple jump by selecting a button on the controller 400. For example, a character named "Tiny Peter" may be caused to jump in the air whenever the user presses a jump button on the controller 400, flicks the controller in a vertical sweep, or issues any other input mapped to a jump command.

In FIG. 4C, the user is guiding their finger along a touch sensitive surface 425 to control movement of the virtual character 420. For example, by dragging their finger to the left side of the surface 425, the virtual character 420 may move to the left. In another example, the virtual character 420 may walk while the user is touching the surface 425 (or another controller button or trigger) and may cease walking when the user removes their finger from the surface 425. The user may use one or more of these example features to move the virtual character 420 along a route (e.g., previously determined using waypoints).

Example Methods

FIG. 5 is a flowchart describing an example method 500 for defining a route for a virtual object in an augmented reality (AR) application, according to one embodiment. The steps of FIG. 5 are illustrated from the perspective of a gaming module (e.g., 314) of a client device (e.g., 310) performing the method 500. However, some or all of the steps may be performed by other entities or components. In addition, some embodiments may perform the steps in parallel, perform the steps in different orders, or perform different steps. The steps of method 500 may be stored on a non-transitory computer-readable medium.

At step 510, the gaming module receives position data indicating a position and orientation of a controller, the position data defining an axis of the controller.

At step 520, the gaming module performs ray casting to determine a location or object in a 3D map of a real world that intersects the axis.

At step 530, the gaming module receives a selection indication.

At step 540, the gaming module selects, subsequent to (e.g., responsive to) the selection indication, the location in the 3D map that intersects the axis as a waypoint.

At step 550, the gaming module defines the route based on the waypoint (e.g., the location of the waypoint in the 3D map). The waypoint may define a start point or end point of the route. In cases where the waypoint is not the start point, the start point of the route may be based on a location of the virtual object in the 3D map.

In some aspects, the method 500 further includes the gaming module identifying one or more real world objects in the 3D map, and defining the route is further based on the identified one or more real world objects. Additionally, the gaming module may identify a material of an identified real world object, where defining the route is further based on the identified material.

In some aspects, the method 500 further includes the gaming module providing (e.g., to the client device) AR data including the virtual object traversing along the route. A movement speed of the virtual object along the route may be based on a material of a real-world object along the route. Additionally, or alternatively, the AR data includes the virtual object interacting with a real-world object at or within a threshold distance of the waypoint.

In some aspects, the method 500 further includes the gaming module receiving traversal characteristics of the virtual object that will traverse the route, where defining the route is further based on the traversal characteristics of the virtual object.

In some aspects, the method 500 further includes the gaming module selecting multiple waypoints subsequent to (e.g., responsive to) receiving multiple selection indications, where the route is defined based on the multiple waypoints. The route may be defined to intersect each of the multiple waypoints.

Example Computing System

Figure 6:
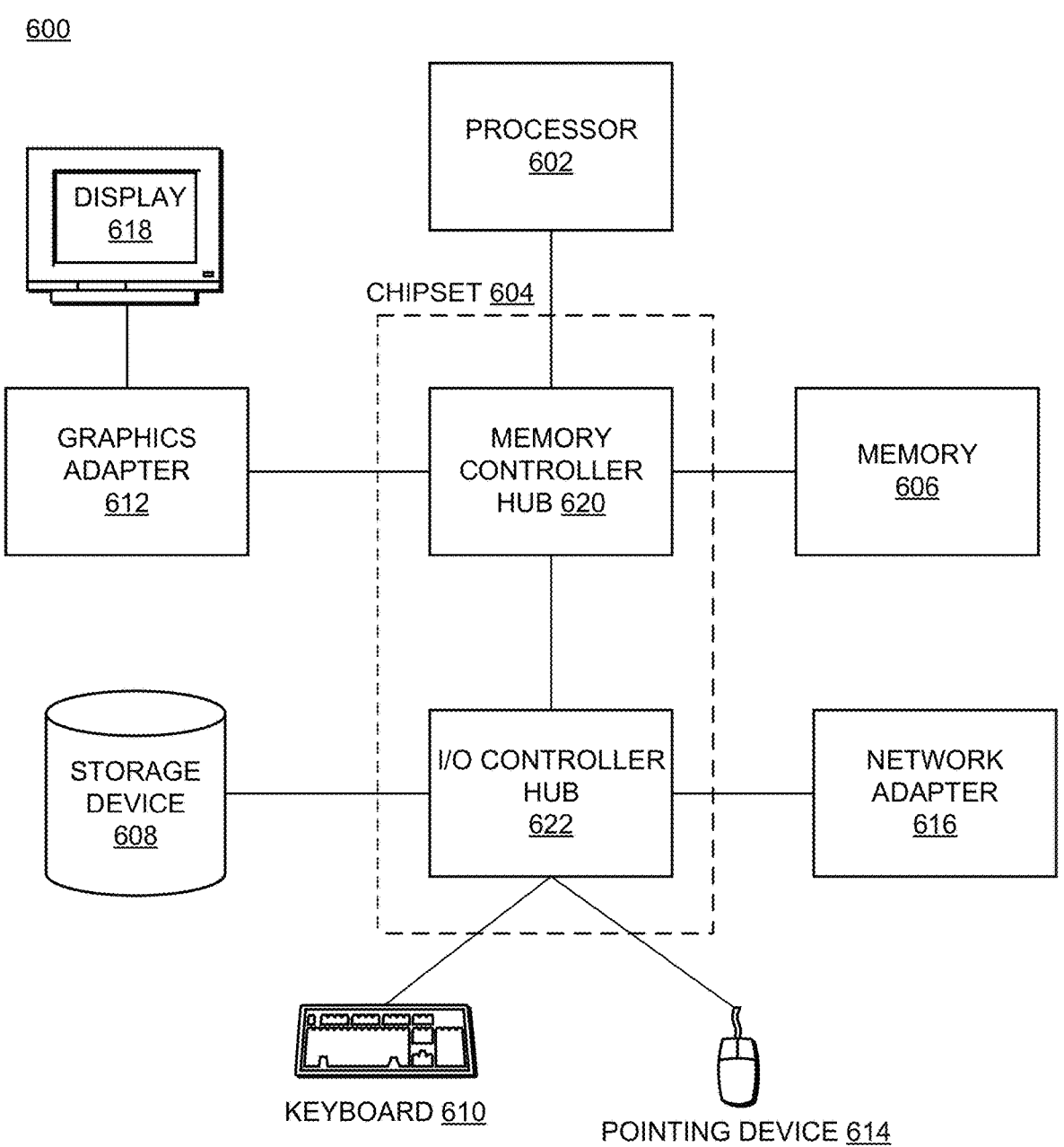
FIG. 6 illustrates an example computer system suitable for use in the networked computing environment of FIG. 1, according to one embodiment.

FIG. 6 is a block diagram of an example computer 600 suitable for use as a client device 310 or game server 320. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 616 couples the computer system 600 to one or more computer networks, such as network 370.

The types of computers used by the entities of FIG. 3 can vary depending upon the embodiment and the processing power required by the entity. For example, the game server 320 might include multiple blade servers working together to provide the functionality described. Furthermore, the computers can lack some of the components described above, such as keyboards 610, graphics adapters 612, and displays 618.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A method for defining a route for a virtual object to travel along in an augmented reality (AR) application, the method comprising:

receiving position data indicating a position and orientation of a controller, the position data defining an axis of the controller;

performing ray casting to determine a location in a 3D map of a real world that intersects the axis;

receiving a selection indication;

selecting, subsequent to the selection indication, the location in the 3D map that intersects the axis as a waypoint;

defining the route for the virtual object to travel along based on the waypoint; and providing, to a client device, AR data including the virtual object traversing along the route, wherein a movement speed of the virtual object along the route is based on a material of a real-world object along the route.

2. The method of claim 1, further comprising identifying the real-world object in the 3D map, wherein defining the route is further based on the real-world object.

3. The method of claim 1, further comprising identifying the material of the real-world object, wherein defining the route is further based on the identified material.

4. The method of claim 1, further comprising receiving traversal characteristics of the virtual object that will traverse the route, wherein defining the route is further based on the traversal characteristics of the virtual object.

5. The method of claim 1, wherein the waypoint defines an end point of the route.

6. The method of claim 5, wherein a start point of the route is based on a location of the virtual object in the 3D map.

7. The method of claim 1, wherein the waypoint defines a start point of the route.

8. The method of claim 1, further comprising providing, to the client device, AR data including the virtual object interacting with a real-world object at the waypoint.

9. The method of claim 1, wherein multiple waypoints are selected subsequent to receiving multiple selection indications, wherein the route is defined based on the multiple waypoints.

10. The method of claim 9, wherein the route is defined to intersect each of the multiple waypoints.

11. The method of claim 1, wherein the real-world object is a portion of ground and the material is a material of the portion of the ground.

12. A non-transitory computer-readable medium storing instructions that, when executed by a computing system, cause the computing system to perform operations comprising:

receiving position data indicating a position and orientation of a controller, the position data defining an axis of the controller;

performing ray casting to determine a location in a 3D map of a real world that intersects the axis;

receiving a selection indication;

selecting, subsequent to the selection indication, the location in the 3D map that intersects the axis as a waypoint;

defining a route for a virtual object to travel along based on the waypoint; and providing, to a client device, AR data including the virtual object traversing along the route, wherein a movement speed of the virtual object along the route is based on a material of a real-world object along the route.

13. The non-transitory computer-readable medium of claim 12, wherein the operations further comprise identifying the real-world object in the 3D map, wherein defining the route is further based on the real-world object.

14. The non-transitory computer-readable medium of claim 12, wherein the operations further comprise identifying the material of the real-world object, wherein defining the route is further based on the identified material.

15. The non-transitory computer-readable medium of claim 12, wherein the operations further comprise receiving traversal characteristics of the virtual object that will traverse the route, wherein defining the route is further based on the traversal characteristics of the virtual object.

16. The non-transitory computer-readable medium of claim 12, further comprising providing, to the client device, AR data including the virtual object interacting with a real-world object at the waypoint.

17. A method for defining a route for a virtual object to travel along in an augmented reality (AR) application, the method comprising:

receiving position data indicating a position and orientation of a controller, the position data defining an axis of the controller;

performing ray casting to determine an object in a 3D map of a real world that intersects the axis;

receiving a selection indication;

selecting, responsive to the selection indication, the object in the 3D map that intersects the axis as a waypoint;

defining the route to travel along based on the waypoint; and providing, to a client device, AR data including the virtual object traversing along the route, wherein a movement speed of the virtual object along the route is based on a material of a real-world object along the route.

18. The method of claim 17, further comprising identifying the real-world object in the 3D map, wherein defining the route is further based on the real-world object.

19. The method of claim 17, further comprising identifying the material of the real-world object, wherein defining the route is further based on the identified material.

20. The method of claim 17, further comprising receiving traversal characteristics of the virtual object that will traverse the route, wherein defining the route is further based on the traversal characteristics of the virtual object.

* * * * *